Nov. 5, 1929.          H. C. RASSMAN          1,734,402
STANCHION
Filed June 28, 1926          2 Sheets-Sheet 1
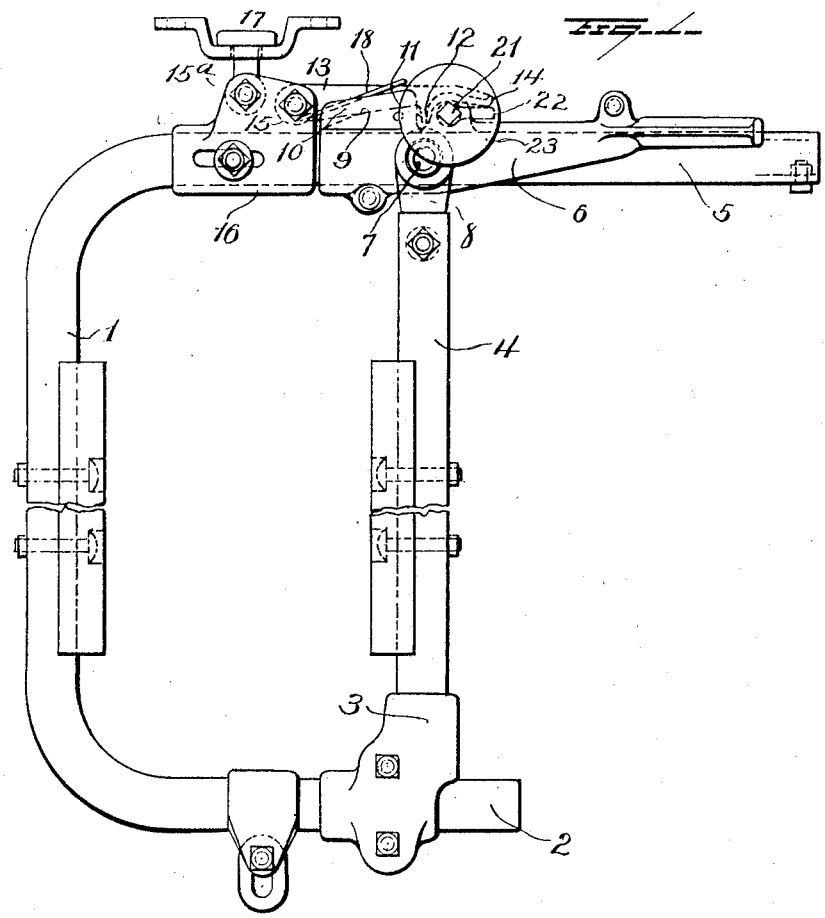
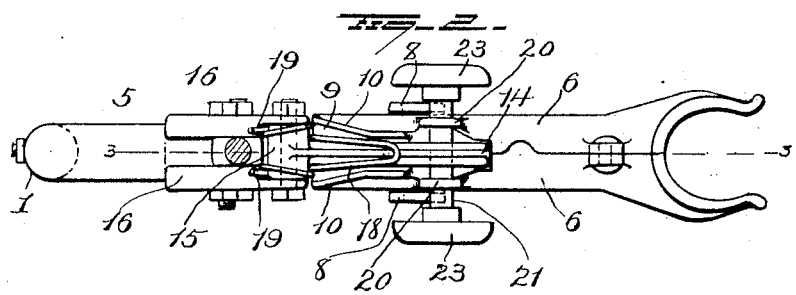
Inventor
H. C. Rassman
By Seymour & Bright
Attorneys

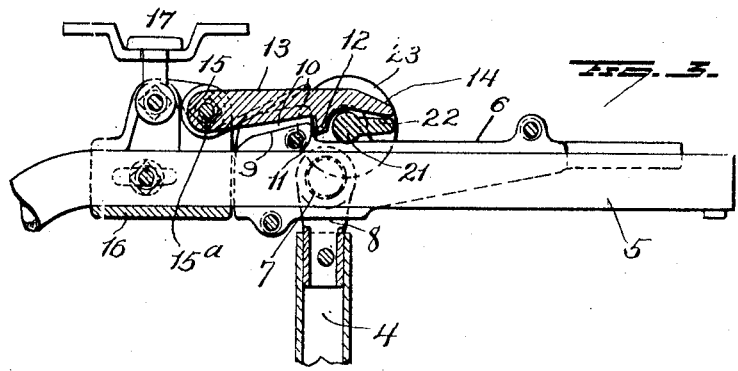
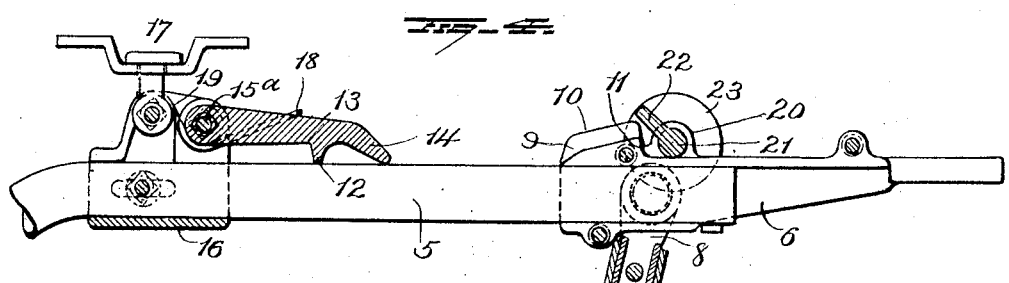
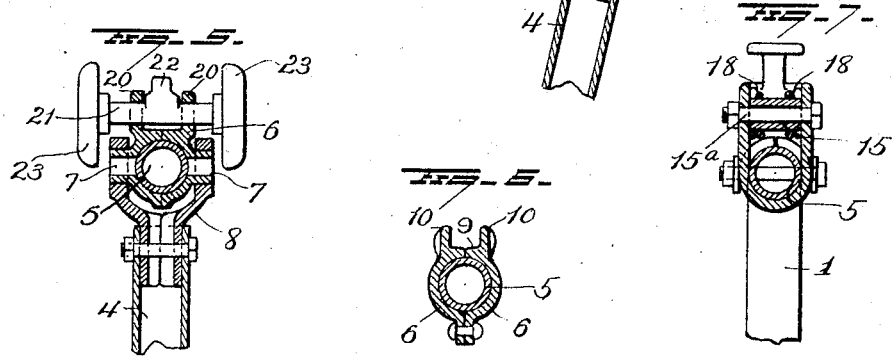

Patented Nov. 5, 1929

1,734,402

UNITED STATES PATENT OFFICE

HUGO C. RASSMANN, OF BEAVER DAM, WISCONSIN, ASSIGNOR TO F. RASSMANN MANUFACTURING COMPANY, OF BEAVER DAM, WISCONSIN

STANCHION

Application filed June 28, 1926. Serial No. 119,068.

This invention relates to improvements in stanchions and more particularly to the locking means for the stanchion bars.

An object of the invention is to provide locking means in which a maximum leverage can be applied for disengaging the latch member carried by one bar from the catch carried by the other bar.

A further object is to provide latch operating means wherein leverage shall be applied to the latch in proximity to the free end thereof to pry said latch from engagement with the catch and thus render the opening of the stanchion very easy.

A further object is to provide a locking mechanism for a stanchion in which a lever action is employed to disconnect the latch from the catch and which may also be employed by cooperation with the latch to positively move the movable stanchion bar relatively to the fixed stanchion bar and thus increase the ease with which the stanchion may be opened.

With these and other objects in view, the invention consists in certain novel features of construction and combinations of parts as hereinafter set forth and pointed out in the claims.

In the accompanying drawings,—

Figure 1 is a view in elevation illustrating my improvements.

Figure 2 is a plan view.

Figure 3 is a sectional view on the line 3—3 of Figure 2.

Figure 4 is a view similar to Figure 3 but showing the stanchion open, and

Figures 5, 6 and 7 are views of details.

1 represents a relatively fixed stanchion bar provided at its lower end with a horizontal arm 2 carrying a socket member 3 in which the lower end of a movable stanchion bar 4 is loosely mounted in a manner to permit movement of said bar to open or close the stanchion. The upper end portion of the relatively fixed bar 1 is provided with an arm 5.

A bracket arm 6 is mounted to slide on the arm 5 and is provided at diametrically opposite points with trunnions 7 having mountings in openings formed in the arms of a bifurcated bracket 8 secured in the upper end of the movable stanchion bar 4 and projecting above the latter. The bracket arm 6 is provided on its top and near its inner end with an inclined way 9 which is made somewhat flaring towards its inner end and provided with side flanges 10. At the outer end of the inclined way, a shoulder is formed which provides a catch 11 for the tooth 12 of a pivoted latch 13,—said latch projecting outwardly from the tooth to form a tongue 14 for a purpose hereinafter explained. The latch 13 is formed at its rear end with a transverse tubular or hub portion 15 to receive a pivot pin 15ª and is disposed within a bracket 16 rigidly but adjustably secured to the arm 5 of the relatively fixed stanchion bar 1. Suspension means 17 may also be connected with this bracket. The arms of a spring 18 are coiled about the hub portion of the latch and at their ends bear against shoulders 19 formed in the bracket 16, while the intermediate portion of the spring bears upon the latch 13 and insures engagement of the latch tooth with the catch.

Perforated ears 20 are formed on the bracket arm 6 and spaced apart to provide bearings for a transverse shaft 21. This shaft is provided between its bearings with a crank or lever arm 22 and at its ends, operating wheels or knobs 23 are secured to said shaft. These parts are so disposed that the lever arm will normally be directly under the tongue forming the free end of the latch when the latter is in locked position and the stanchion closed.

To open the stanchion, the operator will turn the shaft 21 and cause upward movement of the lever arm 22. This lever arm will thus be made to so cooperate with the free end portion of the latch as to raise the latter and pry its tooth from locking relation to the catch, thus rendering the unlocking of the stanchion very easy. Further rotation of the shaft will cause the lever arm to engage the latch tooth and cause the bracket arm 6 to slide on the stanchion arm 5 and thus start the opening of the stanchion. When the stanchion is being closed from the open position shown in Figure 4, the forward portion of the latch will ride on the inclined way and thus be raised in position to permit its tooth to be made to engage the catch shoulder, by the action of the spring.

My improved latch operating means are not only efficient to facilitate the easy unlocking of the stanchion, but they are so located as to be out of reach of the animal and also in position to be readily operated by the attendant without danger of injury from the horns or head of the animal.

Having fully described my invention what I claim as new and desire to secure by Letters Patent, is:

1. The combination with stanchion bars, of a spring pressed latch carried by one of said bars and having pivotal connection therewith, a catch carried by the other bar and slidably engaged with the first bar, and a manually operable lever carried by the stanchion bar which is provided with the catch, said lever being arranged to engage under the free end of the latch to effect the raising of said latch to disengage it from the catch and then fulcrum on the latch to initially open the stanchion bars.

2. The combination with two stanchion bars, one of which is movable relatively to the other, of a bracket arm journaled on the movable stanchion bar and slidably engaged with the relatively stationary bar and provided with a catch, a bracket secured to the stationary stanchion bar, a spring pressed latch mounted in said bracket and provided with a tooth to engage said catch, a shaft mounted on the bracket arm and provided with an arm normally disposed under the free end portion of the latch when the latter is in locking relation to the catch, and a manually operable member secured to said shaft to facilitate the operation thereof whereby to lift the latch from the catch and push the stanchion bars apart.

3. The combination with two stanchion bars, one movable relative to the other, of a catch on one bar, a latch pivotally mounted on the other bar and provided on its under side near its free end with a tooth adapted to engage the catch and hold the stanchion bars closed, and a rocking arm mounted adjacent the catch and lying under the free end of the latch in closed position of the bars, whereby when the arm is rocked it will lift the latch from the catch and then bear against the tooth to initially open the bars.

4. The combination of a relatively fixed stanchion bar, having a lateral arm, a relatively movable stanchion bar, a bracket pivotally attached to the movable bar and slidably encircling the lateral arm of the fixed bar, a catch on said bracket, an inclined way on the bracket leading upward to the catch, a latch pivotally mounted on the fixed bar and adapted to ride through the way and engage the catch, and a releasing device mounted on the bracket adjacent the catch and operable to lift the free end of the latch from the catch.

In testimony whereof, I have signed this specification.

HUGO C. RASSMANN.